(12) United States Patent
Sinclair

(10) Patent No.: US 9,481,520 B2
(45) Date of Patent: Nov. 1, 2016

(54) DISPOSABLE CHUTE TRAYS

(71) Applicant: ABTEC INC., Bristol, PA (US)

(72) Inventor: William S. Sinclair, Langhorne, PA (US)

(73) Assignee: ABTEC INC., Bristol, PA (US)

( * ) Notice: Subject to any disclaimer, the term of this patent is extended or adjusted under 35 U.S.C. 154(b) by 0 days.

(21) Appl. No.: 14/798,036

(22) Filed: Jul. 13, 2015

(65) Prior Publication Data

US 2016/0009495 A1    Jan. 14, 2016

Related U.S. Application Data

(60) Provisional application No. 62/023,413, filed on Jul. 11, 2014.

(51) Int. Cl.
*B65G 11/02* (2006.01)
(52) U.S. Cl.
CPC .................. *B65G 11/023* (2013.01)
(58) Field of Classification Search
CPC ........ B65G 11/02; B65G 11/16; B65G 11/18
USPC .................................. 193/2 D, 2 R
See application file for complete search history.

(56) References Cited

U.S. PATENT DOCUMENTS

| | | | |
|---|---|---|---|
| 7,329,294 | B2 | 2/2008 | Conrad |
| 7,631,387 | B2 | 12/2009 | Sclafani et al. |
| 7,837,958 | B2 | 11/2010 | Crapser et al. |
| 8,020,686 | B2 * | 9/2011 | Babineau ............ B65F 1/10 |
| | | | 193/2 D |
| 8,774,970 | B2 | 7/2014 | Knopow et al. |
| 2004/0031111 | A1 | 2/2004 | Porschia et al. |
| 2005/0115409 | A1 | 6/2005 | Conrad |
| 2006/0282964 | A1 | 12/2006 | Sclafani et al. |
| 2010/0019013 | A1 | 1/2010 | Jamie |
| 2011/0107533 | A1 | 5/2011 | Haan |

FOREIGN PATENT DOCUMENTS

| | | |
|---|---|---|
| CH | 283612 A | 6/1952 |
| DE | 102007062275 A1 | 6/2009 |
| FR | 1392029 A | 3/1965 |
| FR | 2166276A1 A1 | 8/1973 |
| GB | 533718 A | 2/1941 |
| WO | 2012065000 A1 | 5/2012 |

* cited by examiner

*Primary Examiner* — William R Harp
(74) *Attorney, Agent, or Firm* — Cozen O'Connor

(57) ABSTRACT

A foldable and disposable chute trough and base blanks wherein said base can be folded to provide an angled support for said trough and wherein said trough detachably secures to said base at a single pivot point and can thus be replaced once soiled.

18 Claims, 5 Drawing Sheets

DISPOSABLE CHUTE TRAYS

FIELD OF INVENTION

The present application is generally related to trays and cutes for use on manufacturing of plastic or metallic parts from molding machinery that provides for a disposable, cheap and effective chute. The chute is made from inexpensive plastic or paper materials and can be cut from a single sheet, folded into the appropriate conformation whereby it is ready for use, typically, in conjunction with a molding machine.

BACKGROUND OF THE INVENTION

Plastic molding, such as injection molding or extrusion molding, is commonly used to manufacture plastic materials in large quantities. Large machines are utilized to take raw plastic material, heat the material and mold it into various shapes and forms. Upon formation, the plastic materials are then dropped from the machine into a chute and further sorted.

In some instances, remnant materials remaining attached to the intended plastics or further sorting by machine or by hand is required to provide a clean and neat product to prepare the plastic products for use. It is advantageous to provide for a chute to catch the materials as they fall from the molds, and sort them into one or a plurality of boxes.

This is typically accomplished by using a metal, plastic, or fabric chute that is somehow attached to the molding machine, placed near or under the machine, or otherwise hung from or supported by the machine. Unfortunately, there are few convenient options for chutes and no single product yet is sufficient for use in the majority of applications.

Indeed, with the variety of parts, shapes, and sizes that can be manufactured, most molding machines do not come with an installed chute, or manufacturers remove the chutes, because they clog, become soiled, become worm, or cause a nuisance in the manufacturing process. What typically occurs, then, is that chutes are jerry rigged to the machine, and supported by other boxes, chained to the machine, taped, or otherwise precariously attached to or supported under the drop zone on the molding machine.

There is a need in manufacturing to create a simple, inexpensive, replaceable chute that can be easily manufactured from known components and provides for steady and consistent performance for use in plastic molding.

SUMMARY OF THE INVENTION

An embodiment of the invention comprises a collapsible chute comprising: a supporting base blank and a trough blank that can be folded and selectively secured together; said supporting base blank comprising a four sided-base panel and four further panels, one attached to each of the four sides of the base panel, wherein the four panels define a rear panel, a front panel and two side panels and wherein the base panel has a rear tab-receiving slot pair positioned at the edge between the base and a front tab-receiving slot pair positioned at the front panel and the base and the back panel; wherein said slots extend through the blank; wherein the two side panels are mirror images of one another and each comprises a side support attached to the base and then attached to the side support is a front side support and rear side support; wherein the side supports are folded to be perpendicular to the base and the front and rear side supports are further folded perpendicular to the side supports, wherein the side supports are positioned adjacent to the tab-receiving slots; wherein said rear panel is foldably attached to the base and comprises a back base which is attached to the base and back base support which is foldably attached to the back base; wherein the back base support comprises a pair of tabs connected to the end of the back support and the back support folds over and onto the back base at a fold line and over the rear side supports, previously folded; wherein the tabs engage with the rear tab receiving slots engaging the back panel and rear side supports; wherein said front panel is foldably attached to the base and comprises a front base which is attached to the base and front base support which is foldably attached to the front base; wherein the front base support comprises a pair of tabs connected to the end of the front support and the front support folds over and onto the front base at a fold line and over the front side supports, previously folded; wherein the tabs engage with the front tab receiving slots engaging the front panel and front side supports; the trough blank having a base having four sides with the rear side having a pair of tab-receiving slots extending through the trough base and three rails foldably attached to said trough base, wherein two of the rails are substantially parallel side rails and the third rail is foldably attached to the rear side of the trough base; wherein the side rails each comprise a rail flap and a rear side rail flap, wherein the side rails fold at the fold line connecting the side raise to the base to define an angle with the base and positioning the rear rails perpendicular to the side rails; wherein the third raid comprises a first rear panel, and a second rear panel, having two notched tabs wherein the first rear panel and the second rear panel are folded over one another and secure between the two panels, the rear side rail flaps, wherein the notched tabs engage and push through the tab-receiving slots in the trough base and extend beyond the bottom side of the trough base; and wherein the two notched tabs from the trough are selectably engaged to the rear tab receiving slots in the base.

A pair of blanks for a collapsible chute comprising: a supporting base blank and a trough blank; wherein the base blank is folded to define a supporting base and the trough blank is folded to define a trough wherein the trough can be selectively secured to said supporting base; said supporting base blank having a four-sided base having two rear tab-receiving slots defined at the edge of the base and the back support and two front tab-receiving slots at the edge of the base the front support and comprising a two panel back support, a two panel front support, and two side supports, each of which having three panels; wherein the back two panels fold over one another and form the back support and wherein the front two panels fold over one another; and wherein the side supports having three panels, are folded such that the first side panel, attached to the base is folded perpendicular to the base bottom and the two additional panels are folded to be perpendicular to the base bottom and the now folded sides; wherein the tab-receiving slots are holes disposed in the base at the joint between the base and the back and the base and the front; wherein disposed of on one panel of each of the front support and the back support are tabs that secure into said tab-receiving slots in the base to secure the front and back supports together and also secure the two additional side panels between the front and back supports, thus defining a four-sided base; the trough blank comprising three rails attached at one side to four-sided trough base, leaving no rail attached to the front side of the trough base; wherein two of the rails are substantially parallel side rails each having a side rail and a rear side rail and the third rail being a rear rail having two panels; the side rails are folded up at the point of attachment to the base and the rear side rail is folded perpendicular to the side rails; wherein the rear rail comprises notched trough tabs to secure the two rear rail panels together when the rear rail panels are folded over one another at a fold line between the two panels and compress the two rear side panels between the two rear panels; and wherein the notched trough tabs extend through beyond the bottom of the trough base; and wherein the notched trough tabs are selectably attached to the supporting base in the rear tab-receiving slots.

A collapsible chute comprising: a supporting base and a trough that can be selectively secured to said supporting base; said supporting base comprising a back and a back support, a front and a front support, two side panels, and an open top; wherein the back and back support fold over one another and secure between the two back features, a rear portion of each of the two side panels; wherein the front and front support fold over one another and secure between the two front features the front panels from each of the side panels; thereby leaving an open top; the trough comprising three rails, a trough base, and trough tabs; wherein two of the rails are substantially parallel side rails and the third rail is made up of two panels folded over one another and is substantially perpendicular to the side rails; wherein the third rail uses tabs to secure the two panels together and wherein the tabs extend through beyond the bottom of the trough base; and wherein the trough tabs are selectably attached to the supporting base.

A collapsible chute comprising: a supporting base and, a trough that can be selectively secured to said supporting base; said supporting base comprising a back and a back support, a front and a front support, two side panels, and an open top; wherein the back and back support fold over one another and, secure between the two back features, a rear portion of each of the two side panels; wherein the front and front support fold over one another and, secure between the two front features the front panels from each of the side panels; thereby leaving an open top; Wherein there are holes disposed in the base at the joint between the base and the back and the base and the front; wherein disposed of on the front support and the back support are tabs that secure into said holes in the base to secure the front and back supports together; the trough comprising three rails, a trough base, and trough tabs; wherein two of the rails are substantially parallel side rails and the third rail is made up of two panels folded over one another and is substantially perpendicular to the side rails; wherein the third rail uses tabs to secure the two panels together and wherein the tabs extend through beyond the bottom of the trough base; and wherein the trough tabs are selectably attached to the supporting base in the holes in base at the rear joint.

A kit comprising at least one chute and at least one supporting base, wherein the supporting base and, a trough that can be selectively secured to said supporting base; said supporting base comprising a back and a back support, a front and a front support, two side panels, and an open top; wherein the back and back support fold over one another and, secure between the two back features, a rear portion of each of the two side panels; wherein the front and front support fold over one another and, secure between the two front features the front panels from each of the side panels; thereby leaving an open top; wherein there are holes disposed in the base at the joint between the base and the back and the base and the front; wherein disposed of on the front support and the back support are tabs that secure into said holes in the base to secure the front and back supports together; the trough comprising three rails, a trough base, and trough tabs; wherein two of the rails are substantially parallel side rails and the third rail is made up of two panels folded over one another and is substantially perpendicular to the side rails; wherein the third rail uses tabs to secure the two panels together and wherein the tabs extend through beyond the bottom of the trough base; wherein the trough tabs are selectably attached to the supporting base in the holes in base at the rear joint; and wherein the trough is replaceable.

A kit comprising at a set of blanks defining at least two trough and at least one supporting base, wherein the supporting base and a trough can be selectively secured to said supporting base; said supporting base comprising a rear panel having a back and a back support, a front panel having a front and a front support, and two side panels; wherein in the back and rear supports are two panel supports that fold over one another to define the rear and front panels, and the side panels having a side and a rear and front side support; wherein there are two pairs of tab-receiving slots, one disposed in the base at the joint between the base and the back and the other pair disposed of between the base and the front; wherein the front support and the back support comprise corresponding tabs that secure into said holes in the base to secure the front and back supports together; wherein the support base is formed by folding the side panels to be perpendicular to the base and folding each of the rear and front side panels perpendicular to the side panels and then folding the back and front panels over one another and securing the tabs within the tab receiving slots thereby securing the rear and front side panels between the rear and front panels; the trough blank comprising three rails attached at one side to a four-sided trough base; wherein two of the rails are substantially parallel side rails and the third rear rail is made up of two panels folded over one another and is substantially perpendicular to the side rails; wherein the third rail comprises a pair of notched tabs wherein by folding the rear two panels over one another, the tabs can be secured into corresponding tab-receiving slots in the trough base to secure the two panels together and wherein the tabs extend through beyond the bottom of the trough base; wherein the trough tabs are selectably attached to the supporting base in the holes in base at the rear joint; and wherein the kit provides for a replaceable trough when the first trough is solid or damaged through use.

A method of advertising comprising: applying an advertisement to a disposable trough or to a disposable base wherein the disposable trough and the disposable base comprise: a supporting base and, a trough that can be selectively secured to said supporting base; said supporting base comprising a back and a back support, a front and a front support, two side panels, and an open top; wherein the back and back support fold over one another and, secure between the two back features, a rear portion of each of the two side panels; wherein the front and front support fold over one another and, secure between the two front features the front panels from each of the side panels; thereby leaving an open top; wherein there are holes disposed in the base at the joint between the base and the back and the base and the front; wherein disposed of on the front support and the back support are tabs that secure into said holes in the base to secure the front and back supports together; the trough comprising three rails, a trough base, and trough tabs; wherein two of the rails are substantially parallel side rails and the third rail is made up of two panels folded over one another and is substantially perpendicular to the side rails; wherein the third rail uses tabs to secure the two panels together and wherein the tabs extend through beyond the bottom of the trough base; and wherein the trough tabs are selectably attached to the supporting base in the holes in base at the rear joint.

DETAILED DESCRIPTION OF THE DRAWINGS

The embodiments of the invention and the various features and advantages thereto are more fully explained with references to the non-limiting embodiments and examples that are described and set forth in the following descriptions of those examples. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the claims.

As used herein, terms such as "a," "an," and "the" include singular and plural referents unless the context clearly demands otherwise.

As used herein, the term "about" means within 10% of a stated number.

As used herein, the term "primarily" means comprising 75% of said material. For example, "primarily cardboard" is at least 75% cardboard and up to 25% of other products, but may include, as a non-limiting example, 99% cardboard and 1% other material.

The term "hole" or "tab-receiving slot" are used interchangeably, meaning an opening that goes through a material to receive a tab from another panel.

Figure 1A:
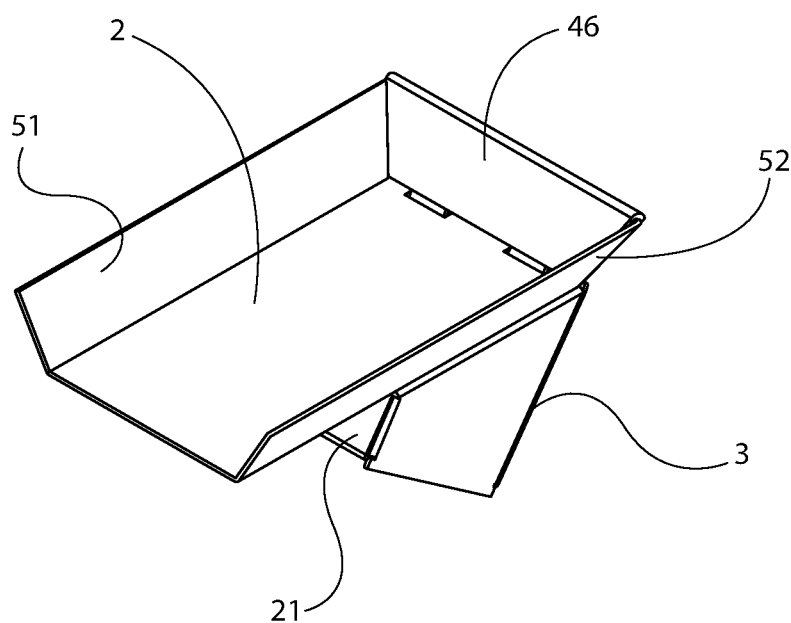
FIGS. 1A and 1B depict an embodiment of a chute and the chute in exploded view.

In view of FIG. 1, a chute 1 is depicted having a trough 2, a base 3, and trough rails 4. In particular, the trough rails 4 are attached to three sides of the trough 2, providing that one end of the trough 2 is open. The chute 1 is designed so that the open end of the trough is situated at the lowest point, allowing gravity to expel parts from the chute 1. Accordingly, the base 3 is designed in an irregular quadrilateral shape, wherein the rear of the trough 2 is situated on the highest point of the base 4, and the open, opposing side of the trough, is positioned to extend past and below the lowest point of the base 4. The trough 2 effectively is placed on top of the base 3 and can be secured to the base 3 thereto.

The trough rails 4, therefore, are positioned one at the rear of the trough 2 and two, being substantially parallel to one another on the sides that run substantially perpendicular to the rear of the trough 2, and run the length of the trough from the rear to the front. Having only 3 sides, the front portion, the $4^{th}$ side, remains open.

Figure 2:
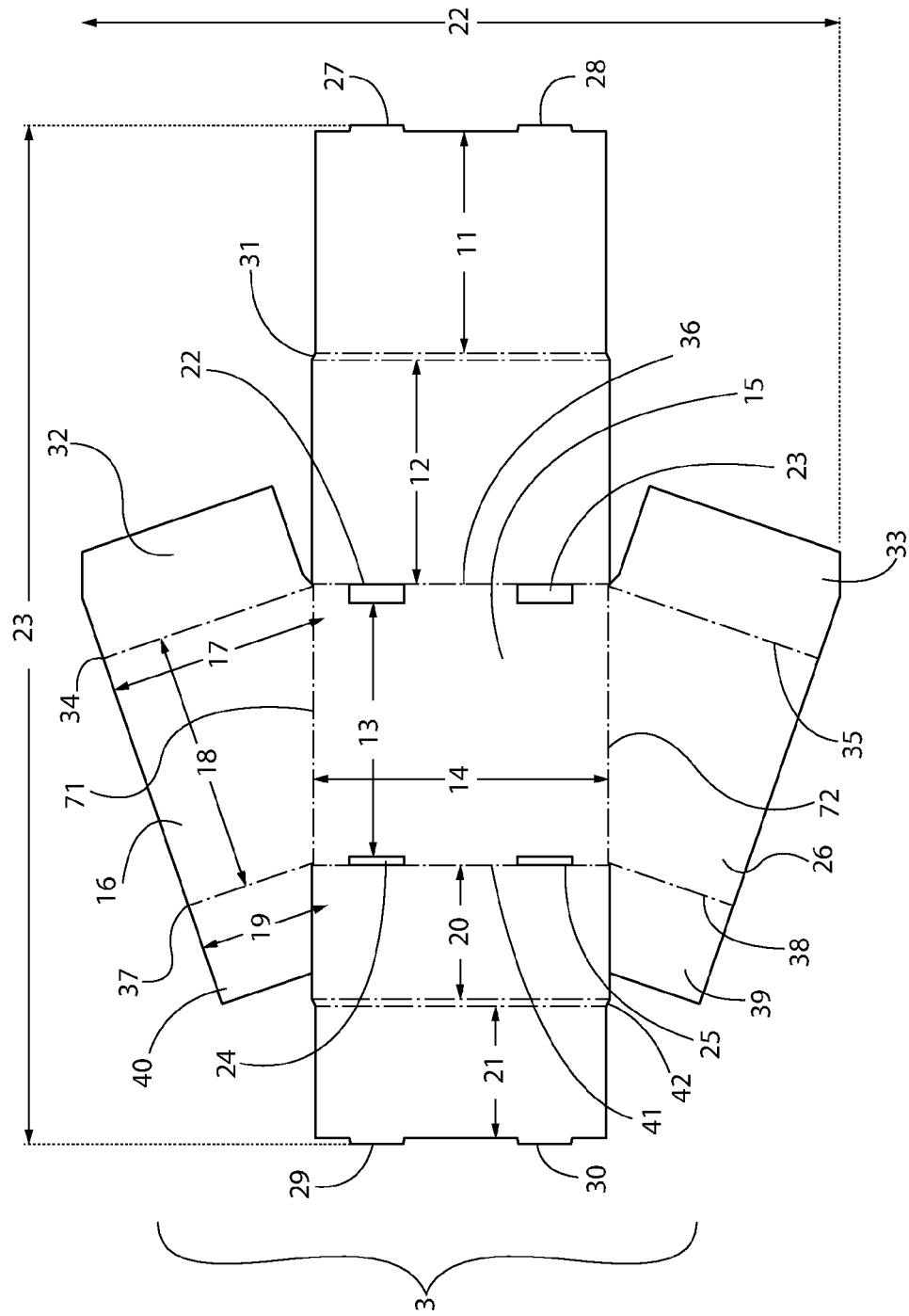
FIG. 2 is a plan of one embodiment of a chute base blank as described herein.
Figure 3:
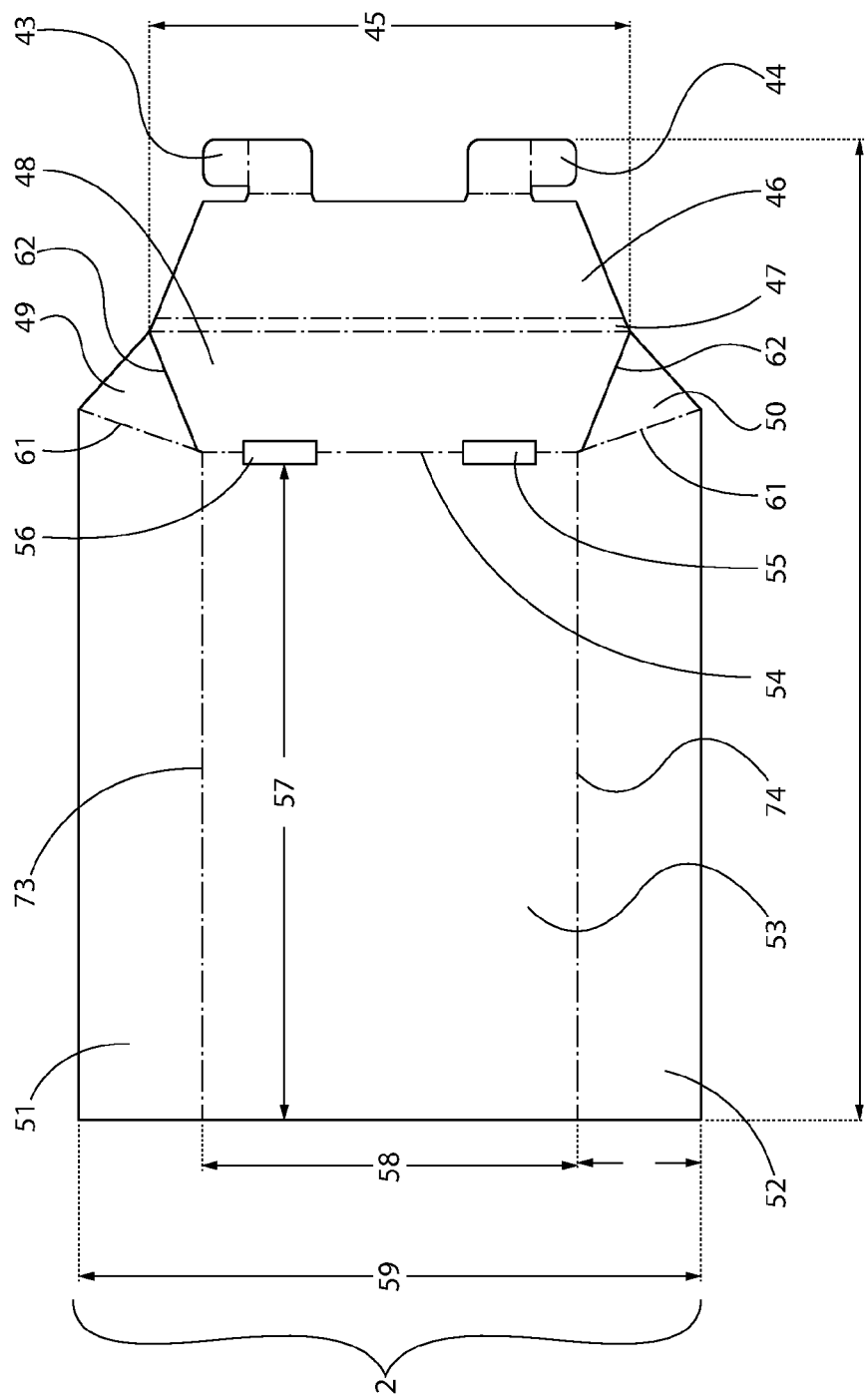
FIG. 3 is a plan view of one embodiment of a chute trough blank as described herein.

As depicted in FIGS. 2 and 3 are the blanks in a plan view. The various dot-dash lines are fold lines. These fold lines are used to fold the blanks into the three-dimensional shapes for the ultimate resulting product, which is a base and a trough that together define a chute. For clarity, the folds in FIG. 2 are 90° at fold lines 37, 34, 71, 36, 41, 38, 72, and 35. While the double dot-dash lines at 42 and 31 ensure two 90° folds, which allows features 21 and 20 and 11 and 12 to be folded on top of one another. In FIG. 3, the dot-dash lines 71, 74, and 54 are typically between about 20° and 90°, whereas the double dot-dash lines at 47 result in two 90° folds to allow 48 and 46 to fold over one another. The fold lines on the tabs 43 and 44 allow the tabs to fold or move to properly fit into the tab-receiving slots 55 and 56.

FIG. 2 depicts a plan view of the base 3. The base 3 as shown is pre-cut and pre-creased so as to be foldable into the base 3. Beginning with the right base side 16 and the left base side 26, are folded at fold lines 71 and 72 to be about perpendicular to the base 15. Once the left hand right sides 16 and 26 are perpendicular to the base 15, the rear right panel 32 and rear left panel 33 are folded at the fold lines 34 and 35, to be about perpendicular to the now vertical base sides 16 and 26 and in contact with the base 15 to be adjacent to the rear holes 22 and 23 along rear top joint 36.

A further step engages the base back support 12, which is folded to a vertical position along the rear top fold line 36 and will be positioned against the folded side panels 32 and 33. The base back 11 is next folded to contact the back base support 12, by folding at the fold line 31, and folding the back base 11 over the rear left and right panels 32 and 33. As all components are folded into place, the base back 11 is secured into position using the rear right tab 27 and rear left tab 28 into the rear right hole 22 and rear left hole 23. Accordingly, upon completion of this folding step, the right and left panels 32 and 33 are secured between the base back 11 and base back support 12.

Moving to the front portion of the base 3, the front right panel 40 and front left panel 39 are folded at a perpendicular to the sides 16 and 26 at the joints 37 and 38. As depicted the line between the base front 20 and the front right panel 40 and front left panel 39 are cut lines. These allow the panels 39 and 40 to separate from the base front 20. The front right panel 40 and front left panel 39 are then aligned along front fold line 41 and adjacent to the front tab holes 24 and 25. As with the rear portion, the base front 20 is folded vertically at the front fold line 41, to be in contact with the front right panel 40 and front left panel 39. Subsequently, the base front support 21 is folded at fold line 42 over the front right panel 40 and front left panel 39 and secured with the front tabs 29 and 30, into the front tab holes 24 and 25. This provides that the front panels 40 and 39 are secured between the base front 20 and the base front support 21, the completed base can be seen in FIGS. 1A and 1B and FIG. 4B.

The result of the now configured base 3 is an irregular quadrilateral, with a front side having a height 19 and a rear side having a height 17, with a length 13 and a width 14. The front height 19 is preferably shorter than the rear height 17 so that the trough 2, when attached to the base 3 is angled down to funnel components dropping into the chute to flow out of the chute. Furthermore, one side of the base 3 is open, and the open side can be placed either face down on a surface, or in other instances face up on the surface. However, it is typically used with the open face being placed face down on a surface. This is in part, due to the fact that the rear holes 22 and 23 may be further utilized to then support or secure a trough 2 to the now configured base 3.

Figure 1B:
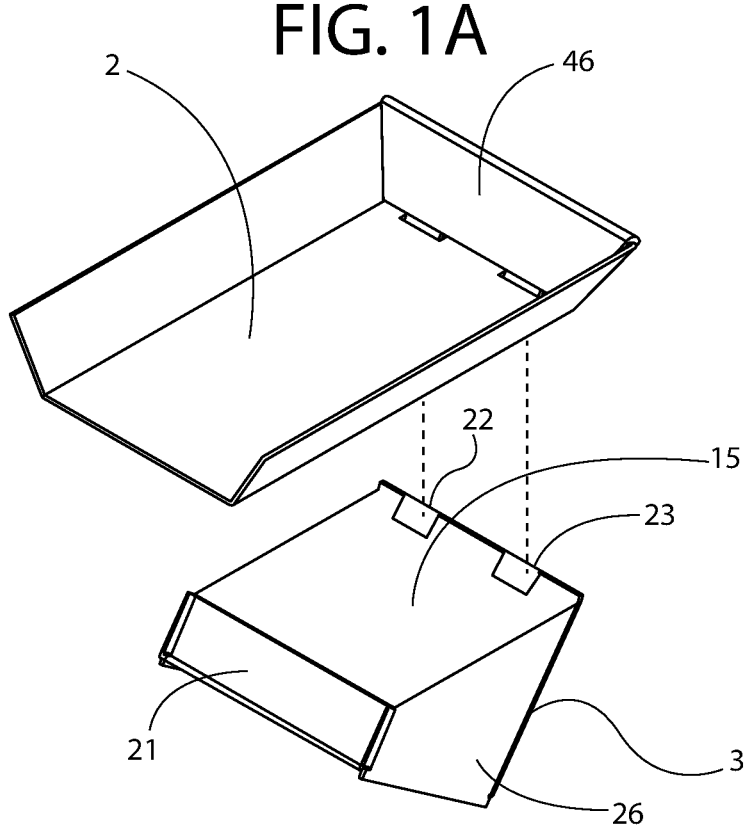
Figure 4B:
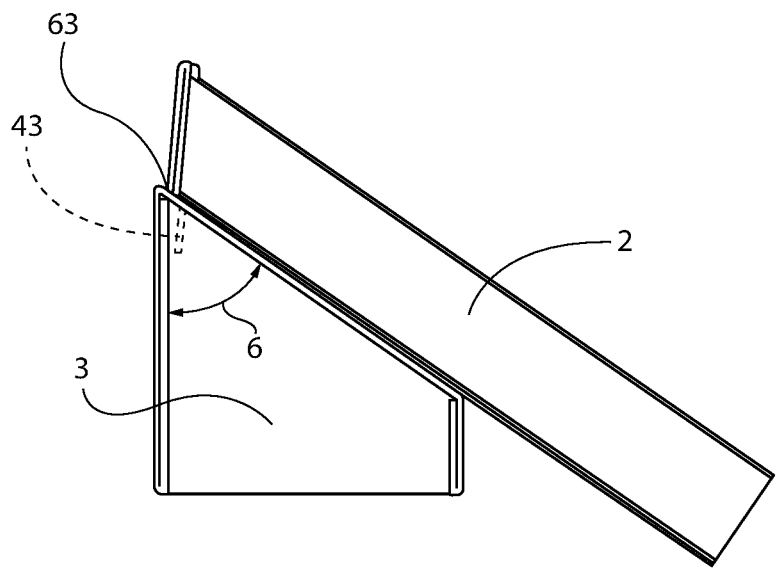
Figure 5:
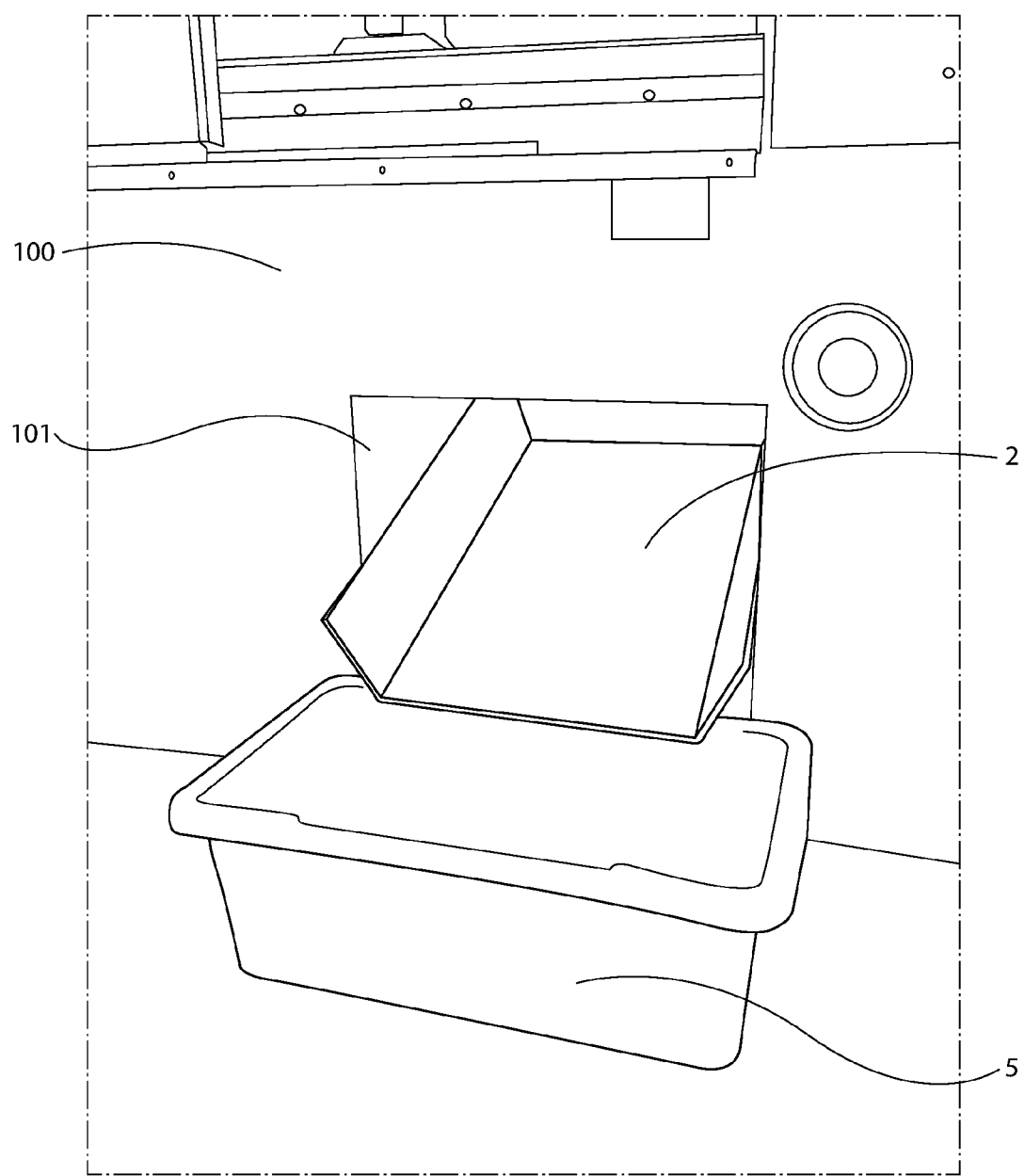
FIG. 5 is a view of a chute in use in a molding machine.

Indeed, the rear holes 22 and 23 are useful in securing the trough 2 to the configured base 3. The trough tabs 43 and 44 extend past the bottom of the base and allow for selective attachment to the base 3 as depicted in FIG. 1B and FIG. 4B. Attachment via the tabs 43 and 44 into the rear holes 22 and 23 allows the trough to then pivot and change the angle of the chute based on this attachment point between the trough tabs 43 and 44 and the rear holes 22 and 23. It is envisioned that a collection box or other device may be placed at the open end of the chute, and the chute may then rest upon such box or device as is depicted in FIG. 5. By allowing for a pivot point, the base 3 remains stable, but the chute angle can be modified as needed for the particular use.

Indeed, turning to FIG. 3 an embodiment of a trough blank 2 is depicted in an unfolded schematic. Like the base 3, the trough 2 folds easily into shape via a pre-cut material that is pre-creased to allow for easy folding. The right rail 51 and left rail 52 fold to an angle of between 20 and 90 degrees from the horizontal at fold lines 73 and 74. As an intermediate step, the rear trough panel 46 folds at the rear trough panel fold line 47 and folds over the rear trough panel support 48. The rear trough panel support 48 is then folded slightly at fold line 54, such that the rear trough panel support 48 contacts the rear side rail flaps 49 and 50. To secure the rear trough panel 46 in place, the trough right tab 43 and trough left tab 44, are secured into the left and right trough holes 55 and 56. The rear side rail flaps 49 and 50 are separated from the rear trough panel support 48 at the trough cut lines 62, which thereby releases the rear side rail flaps 49 and 50 so that they are connected to the rails 51 and 52 at the rail flap fold line 61. The read side rail flaps 49 and 50 thereby fold into and secure between the rear trough panel 46 and the rear trough panel support 48. This results in a stable support of the rails 51 and 52, and wherein the rail angle is determined, in-part, by the amount of material secured between the rear trough panel support 48 and the rear trough panel 46, for each of the rear side rail flaps 49 and 50.

Once the rear trough panel 46 is secured in place with the trough tabs 43 and 44, these tabs 43 and 44 extend past the trough bottom 53 and allow the trough tabs 43 and 44 to be secured into the base holes 22 and 23 (from FIG. 2) as is depicted in FIG. 1B. This secures the trough 2 to the base 3 in a simple an efficient manner. However, it further provides several advantages, by creating a simple attachment point that creates a lever. This allows the trough 2 to be angled according to the needs of the user.

The trough bottom 53 and the internal portions of the rails (after folding) 51, 52, and 46, can be coated with a protective coating to improve the wear and tear on the materials. For example, a non-stick coating may be utilized to reduce friction, a heat resistant coating may be applied to impart further resistance to hot parts, and flame retardant coatings may be applied to give protection to hot parts. Furthermore, absorbent coatings may be applied alone, or in conjunction with a non-stick or heat resistant coating. In certain embodiments, it is preferred that one side of the trough blank, as depicted in FIG. 3 is coated with the protective coating, as well as the reverse side of the rear trough panel 46 to ensure the coating covers the top portion of the trough when assembled.

It is particularly suited that the base 3 and the trough 2 are made of standard weight cardboard materials to minimize cost. Accordingly, imparting certain coatings onto portions of the trough 2 that are to be contacted by parts dropping from the molding machine, can aid in extending the useful lifetime of the trough 2, as well as increase safety in use of these disposable chutes 1. Such coatings may include polymers, plastics, resins, etc. and combinations thereof, as are known to one of ordinary skill in the art.

In certain embodiments, in at least some, if not all portions of the trough 2, the material is porous so that oil, grease, or other materials from the molding machines is absorbed by the trough 2 material, and does not then soil the newly manufactured parts, or soil parts that are already manufactured and sorted into a box situated at the end of the chute 2. Accordingly, it is preferred that a coating on the trough 2 imparts protection, but also allows for absorption of some oil, grease, water, or other material, into, for example, the cardboard. Once a chute 2 is soiled, it is envisioned that it would be removed from the base 3 and replaced with a new chute 2. Because the chute 2 is inexpensive to manufacture and takes up little space in its unfolded, or even folded form, a new chute 2 can be quickly and efficiently folded and secured to the base 3 for further use.

In other embodiments, the base 3 and trough 2 may be made of a plastic material, such as corrugated plastic. Other suitable inexpensive materials, or combinations of materials may be used as is known to one of skill in the art. In particular, it is suitable to use one material for the base 3 and a different material for the trough 2. Furthermore, as the trough 2 is intended to be disposable, different materials may be used for different needs.

It is intended that the trough 2 can be used for a few runs or for a few days before being disposed and replaced with a new trough 2. This particularly allows the trough 2 to remain clean so that the new molded materials are not soiled. The base 3, is it is not in contact with molded parts, can typically be used for a much longer period of time. However, it too, is intended to be replaceable after a period of use.

Figure 4A:
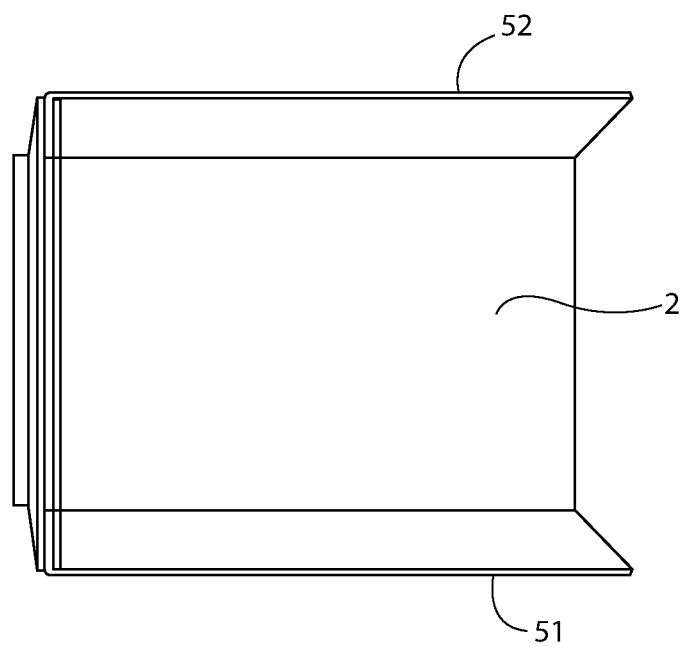
FIGS. 4A and 4B depict a top plan view and a side profile view of an assembled chute.

FIG. 4A is a top down view of the disposable chute 1 when configured. FIG. 4A further identifies the trough 2 and the trough rails 51 and 52. Thus, the trough, when configured defines a trough having raised sides and a raised rear rail.

In view of FIG. 4B, a side profile is shown that depicts the trough 2 being secured to the base 3. In particular, the trough tab 43 can be seen in the side profile. The trough tab 43 is secured through the rear holes 22 and 23 (E.g. in FIG. 1B) thus securing the trough 2 to the base 3. This provides for a trough pivot point 63 based on the attachment of the tabs 43 and 44 into the rear holes 22 and 23. Accordingly, the trough 2 can then be raised up and away from the base 3, while remaining connected to the base 3 at the pivot point 63. This provides greater flexibility for use of the trough 2 at a greater range of angles than if the trough 2 was firmly affixed to the base 3. The base 3 supports the weight of the trough 2 and any parts that are dropped onto the trough 2. The trough 2 extends below the level of the base 3 in this embodiment. Further depicted is the angle 6 of the trough 2 as situated on the base 3. The angle allows for molded parts to then fall by gravity into a further holding container or sorting mechanism, as appropriate for the installation.

FIG. 5 depicts a chute 1 as placed within the opening 101 of a molding machine 100, with the trough 2 extending out of the machine and a bucket 5. The bucket 5 allows for collection of molded parts after they have been ejected from the machine 100 and then fall by gravity from the trough 2 into the bucket 5. If the bucket 5 is taller, then the bottom edge of the trough would lift via the pivot point 63, and the trough would still remain securely attached to the base 3. Furthermore, the trough 2, can easily fit inside an opening 101, and the trough rails, can be further compressed or cut to fit into smaller spaces, if necessary.

A significant benefit of the disposable trough, is that as depicted in FIG. 5, if the trough 2 is soiled during a run, the entire chute can be easily removed from the machine since it is not attached to any particular feature, and the trough 2 can simply be removed and discarded. A new trough 2 can be quickly folded into shape, replaced on the base 3, and the chute is ready to be replaced in the opening 101 of the machine 100. This saves considerable time over the prior art that is either attached to the machine or is too expensive, such that it should be cleaned and re-used. Therefore, in preferred embodiments, the chute 1 is not secured to a machine, it is only placed within, adjacent to, or below an outlet for parts being ejected from the machine. Thus, since it is not connected to the machine at any point, removal or replacement is quick and easy.

In some embodiments, it may be suitable to add a supporting mass to the base. This can be accomplished by placing a thin mass between the base front 20 and base front support 21, or between the base back 11 and base back support 12, or both. Similarly, a weighted material may be affixed to or applied to one or more of the particular panels to provide additional mass to the base. Such mass can be easily added by spraying on a heavy material to those base portions, or securing a metal, plastic, wood, or other suitably heavy material at those positions between the various flaps, or simply securing to the base with an adhesive. This mass increases the weight or heft of the base thus increasing the stability or support of the base, and preventing the base from tipping over when items drop onto the chute.

It is envisioned that the trough 2 is a replaceable and disposable feature. Indeed, a further embodiment provides a chute kit comprising a set of blanks comprising at least one base 3 blank and at least two trough blanks 2, wherein the trough 2 is replaceable after a single or multiple uses, and the second or additional chutes may then replace the first or subsequent trough 2 as it is either soiled or needs replacement for other reasons. Thus, the kit provides for a base 3 that is reusable with several disposable troughs 2. In certain kits, a single base 3 may include a plurality of troughs 2.

In further embodiments, a chute kit may comprise two or more bases 3 and at least two troughs 2. Indeed, in preferred embodiments, a plurality of troughs 2, such as three—100, or more, would be included in a kit. Because the troughs 2 are inexpensive, can be folded into position, and are disposable, these troughs provide a simple and cost effective way to manufacture. Wherein typical affixed chutes are relatively expensive, there is a need to clean them after a number of uses, which then requires their removal, cleaning, then re-attachment before manufacturing can resume. By use of the disposable chutes having replaceable bases 3 and troughs 2, the upfront cost of the secured chutes is eliminated, and the down time between runs because of the need to detach, clean, and re-attach the affixed chutes is eliminated. This results in greater run times and less down time than an affixed chute.

It is further envisioned that the trough 2 and or base 3 may be covered with advertisements or other applied images or text. This provides that a company could apply designs or information on the chutes advertising for its products, or providing other text or designs it deemed important or relevant to the product or products to be manufactured.

Accordingly, a method of advertising comprising applying an advertisement or a design to a disposable chute trough 2, to the chute base 3, or combinations thereof. Wherein a further step of the method comprises selling the troughs 2 or bases 3, or giving them away so as to place advertisements to a consumer. This may be particularly relevant to companies for providing samples to customers that include their advertising or information on the side of the base 3 or trough 2.

Although the present invention has been described in considerable detail, those skilled in the art will appreciate that numerous changes and modifications may be made to the embodiments and preferred embodiments of the invention and that such changes and modifications may be made without departing from the spirit of the invention. It is therefore intended that the appended claims cover all equivalent variations as fall within the scope of the invention.

What is claimed is:

1. A collapsible chute comprising:
  a. a supporting blank and a trough blank that can be folded and selectively secured together;
  b. said supporting blank comprising a four sided-base panel and four further panels, one attached to each of the four sides of the base panel, wherein the four panels define a rear panel, a front panel and two side panels and wherein the base panel has a rear tab-receiving slot pair positioned at the edge between the base panel and the rear panel and a front tab-receiving slot pair positioned at the edge of the front panel and the base panel; wherein said slots extend through the blank;
  c. wherein the two side panels are mirror images of one another and each comprises a side support attached to the base panel and then attached to the side support is a front side support and rear side support; wherein the side supports are folded to be perpendicular to the base panel and the front and rear side supports are further folded perpendicular to the side supports, wherein the side supports are positioned adjacent to the tab-receiving slots;
  d. wherein said rear panel is foldably attached to the base panel and comprises a back base and a back base support, wherein the back base is attached to the base panel and back base support is foldably attached to the back base; wherein the back base support comprises a pair of tabs connected to the end of the back support and the back support folds over and onto the back base at a fold line and over the rear side supports, previously folded; wherein the tabs engage with the rear tab receiving slots engaging the rear panel and rear side supports;
  e. wherein said front panel is foldably attached to the base panel and comprises a front base which is attached to the base panel and front base support which is foldably attached to the front base; wherein the front base support comprises a pair of tabs connected to the end of the front support and the front support folds over and onto the front base at a fold line and over the front side supports, previously folded; wherein the tabs engage with the front tab receiving slots engaging the front panel and front side supports;
  f. the trough blank having a base having four sides with the rear side having a pair of tab-receiving slots extending through the trough base and three rails foldably attached to said trough base, wherein two of the rails are substantially parallel side rails and the third rail is foldably attached to the rear side of the trough base; wherein the side rails each comprise a rail flap and a rear side rail flap, wherein the side rails fold at the fold line connecting the side raise to the base to define an angle with the base and positioning the rear rails perpendicular to the side rails; wherein the third raid comprises a first rear panel, and a second rear panel, having two notched tabs wherein the first rear panel and the second rear panel are folded over one another and secure between the two panels, the rear side rail flaps, wherein the notched tabs engage and push through the tab-receiving slots in the trough base and extend beyond the bottom side of the trough base; and g. wherein the two notched tabs from the trough are selectably engaged to the rear tab receiving slots in the base.

2. The chute of claim 1 further comprising a coating provided on the trough base and rails.

3. The chute of claim 2 wherein the coating imparts fire resistance to the trough.

4. The chute of claim 2 wherein the coating imparts a reduced friction surface to the trough.

5. The chute of claim 1 further comprising a supporting mass; wherein said supporting mass can be selectively attached to said supporting blank to increase the weight of the supporting blank for stability and support.

6. The chute of claim 1 being composed primarily of cardboard.

7. The chute of claim 1 being composed primarily of plastic.

8. A pair of blanks for a collapsible chute comprising:
a. a supporting blank and a trough blank; wherein the blank is folded to define a supporting base and the trough blank is folded to define a trough wherein the trough can be selectively secured to said supporting base;
b. said supporting blank having a four-sided base comprising a two panel back support, a two panel front support, and two side supports, each of which having three panels, and having two rear tab-receiving slots defined at the edge of the four-sided base and the back support and two front tab-receiving slots at the edge of the four-sided base the front support and; wherein the back two panels fold over one another and form the back support and wherein the front two panels fold over one another and form the front support; and wherein the side supports, having three panels, are folded such that the first side panel, attached to the four-sided base is folded perpendicular to the four-sided base and the two additional panels are folded to be perpendicular to the four-sided base and the now folded sides;
c. wherein the tab-receiving slots are holes disposed in the four-sided base at the joint between the four-sided base and the back support and the four-sided base and the front support; wherein disposed of on one panel of each of the front support and the back support are tabs that secure into said tab-receiving slots in the four-sided base to secure the front and back supports together and also secure the two additional side panels between the front and back supports, thus defining a four-sided base;
d. the trough blank comprising three rails attached at one side to four-sided trough base, leaving no rail attached to the front side of the trough base; wherein two of the rails are substantially parallel side rails each having a side rail and a rear side rail and the third rail being a rear rail having two panels; wherein the side rails are folded up at the point of attachment to the base and the rear side rail is folded perpendicular to the side rails; wherein the rear rail comprises notched trough tabs to secure the two rear rail panels together when the rear rail panels are folded over one another at a fold line between the two panels and compress the two rear side panels between the two rear panels; and wherein the notched trough tabs extend through beyond the bottom of the trough base; and
e. wherein the notched trough tabs are selectably attached to the supporting base in the rear tab-receiving slots.

9. The blanks of claim 8 further comprising a coating provided on the trough base and rails.

10. The blanks of claim 9 providing added durability to the trough.

11. The blanks of claim 9 providing fire resistance to the trough.

12. The blanks of claim 9 imparting a reduced friction surface to the trough.

13. The blanks of claim 8 further comprising a mass; wherein said mass can be selectively attached to said blank to increase the weight of said blank.

14. The blanks of claim 8 being composed primarily of cardboard.

15. The blanks of claim 8 being composed primarily of plastic.

16. A kit comprising at a set of blanks defining at least two trough and at least one supporting base, wherein
a. the supporting base and a trough can be selectively secured to said supporting base;
b. said supporting base comprising a four-sided base, a rear panel having a back and a back support, a front panel having a front and a front support, and two side panels; wherein the back and back support and front and front support fold over one another to define the rear and front panels, and the side panels having a side and a rear and front side support;
c. wherein there are two pairs of tab-receiving slots, one disposed in the four-sided base at the joint between the four-sided base and the back and the other pair disposed of between the four-sided base and the front; wherein the front support and the back support comprise corresponding tabs that secure into said holes in the four-sided base to secure the front and back supports together; wherein the support base is formed by folding the side panels to be perpendicular to the four-sided base and folding each of the rear and front side panels perpendicular to the side panels and then folding the back and front panels over one another and securing the tabs within the tab receiving slots thereby securing the rear and front side panels between the rear and front panels;
d. the trough blank comprising three rails attached at one side to a four-sided trough base; wherein two of the rails are substantially parallel side rails and the third rear rail is made up of two panels folded over one another and is substantially perpendicular to the side rails; wherein the third rail comprises a pair of notched tabs wherein by folding the rear two panels over one another, the tabs can be secured into corresponding tab-receiving slots in the trough base to secure the two panels together and wherein the tabs extend through beyond the bottom of the trough base;
e. wherein the trough tabs are selectably attached to the supporting base in the holes in base at the rear joint; and
f. wherein the kit provides for a replaceable trough when the first trough is solid or damaged through use.

17. The kit of claim 16 further comprising at least one advertising image positioned on at least one face of the trough.

18. The kit of claim 16 further comprising at least one advertising image positioned on at least one face of the supporting base.

* * * * *